United States Patent [19]

Soye et al.

[11] Patent Number: 5,316,700
[45] Date of Patent: May 31, 1994

[54] METHOD AND APPARATUS FOR REMOVING EXCESS LENS FORMING MATERIAL

[75] Inventors: Paul J. Soye, Evanston, Ill.; Samuel Loshaek, Longboat Key, Fla.

[73] Assignee: Wesley-Jessen Corporation, Chicago, Ill.

[21] Appl. No.: 970,357

[22] Filed: Nov. 2, 1992

[51] Int. Cl.$^5$ ............................................. B29D 11/00
[52] U.S. Cl. ..................................... 264/1.1; 249/82; 249/141; 249/160; 264/2.2; 264/2.6; 425/808; 425/812
[58] Field of Search ........................ 264/2.2, 2.6, 1.1; 425/808, 812, 406; 249/82, 141, 160

[56] References Cited

U.S. PATENT DOCUMENTS

| | | | |
|---|---|---|---|
| 4,138,086 | 2/1979 | Mizutani et al. | 425/808 |
| 4,197,266 | 4/1980 | Clark et al. | 264/2.2 |
| 4,680,149 | 7/1987 | Rawlings et al. | 425/808 |
| 5,143,660 | 9/1992 | Hamilton et al. | 264/2.2 |

FOREIGN PATENT DOCUMENTS 0545720 6/1993 European Pat. Off.
2226272 6/1990 United Kingdom.

Primary Examiner—James Lowe
Attorney, Agent, or Firm—Warrick E. Lee, Jr.

[57] ABSTRACT

Process and apparatus for molding the front and rear surfaces of a contact lens in one step is disclosed. Two mold halves matable to form a contact-lens-shaped cavity and a cavity for excess lens forming material surrounding the cavity are provided. The improvement comprises providing the cavity for excess lens forming material with at least two openings and producing differential gas pressure across the openings to remove excess lens forming material.

8 Claims, 4 Drawing Sheets

METHOD AND APPARATUS FOR REMOVING EXCESS LENS FORMING MATERIAL

BACKGROUND

This invention concerns a technique for producing contact lenses by molding the front and rear surfaces of the lens with one molding step. Two mold halves, the use of which is well known in the art, are used. A first mold half has a convex lens molding surface, and a second mold half has a concave lens molding surface. Contact lens forming material, e.g. monomer or a mixture of monomers suitable for making a contact lens, is placed on the concave surface. Upon mating of the mold halves, a contact-lens-shaped cavity filled with lens forming material is formed between the convex and concave surfaces. The lens forming material is then cured, e.g. polymerized, to form a contact lens.

In order to assure that the contact lens cavity is completely filled with lens forming material, extra material must be used. The excess material will, of course, be located outside of the lens cavity when the mold halves are mated. Like the material in the cavity, the excess material will also solidify during cure. This excess solid material so formed is called "flash." The flash may be softer and tackier than the cured lens, since it is in contact with air, a polymerization retarder, outside the cavity. This flash is potentially troublesome, because it can settle and stick to the molded lens, thereby rendering the lens unusable. It is conventional to provide an annular cavity surrounding the lens forming cavity to accommodate the flash. However, even when there is a flash cavity, the flash can still be troublesome.

Hamilton et al, in UK Patent Application GB 2 226 272A, disclose use of holes in the bottom of the flash cavity for draining the excess lens forming material. However the quantity of excess lens forming material is not large enough to readily flow by gravity through a small opening. Moreover the lens forming material has a tendency to wet the material of which the mold is constructed, making efficient removal by gravity flow unlikely.

SUMMARY OF THE INVENTION

The present invention provides a method and apparatus for removing excess lens forming liquid by providing two openings in the flash cavity and differential gas pressure across the openings so that the excess material is literally sucked or blown out of the flash cavity. When this invention is practiced, removal of excess lens forming liquid is far more complete than when prior art methods are used, as evidenced by the substantial absence of flash on the lens.

DRAWING DESCRIPTION

FIGS. 1-5 are sectional views. Rotation of each sectional view 180 degrees about axes 25 would generate the apparatus in three dimensions.

DETAILED DESCRIPTION OF THE INVENTION

The exact design of the mold halves is not critical to this invention as long as a space for excess lens forming material having two openings is provided. Hence any of the numerous mold designs prevalent in the art will suffice. Similarly the composition of the lens forming liquid forms no part of this invention. Any monomer or mixture of monomers suitable for forming contact lenses may be used. The lens forming material may be hydrophobic, e.g. methyl methacrylate or silicone acrylate, or it may be hydrophilic, e.g. hydroxyethyl methacrylate, methacrylic acid, N-vinyl-2-pyrrolidone, etc. If the lens forming monomer is hydrophilic, it may be mixed with a solvent, e.g. ethylene glycol, to form the lens forming material that is used in accordance with the invention.

As used herein, the term "environment outside of the mated mold halves" is intended to mean that space that is outside of the lens forming cavity and annular cavity formed by the mated mold halves.

Figure 1:
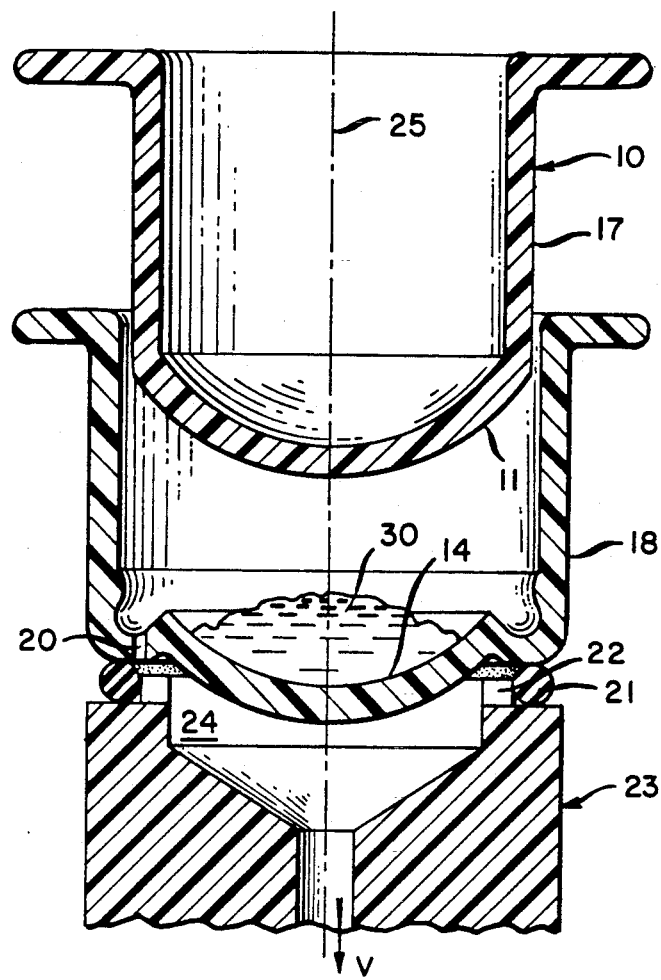
FIG. 1 illustrates mold halves that may be used to practice the invention with contact lens forming material deposited on the concave lens molding surface. Preferred apparatus for creating differential gas pressure is also shown.
Figure 2:
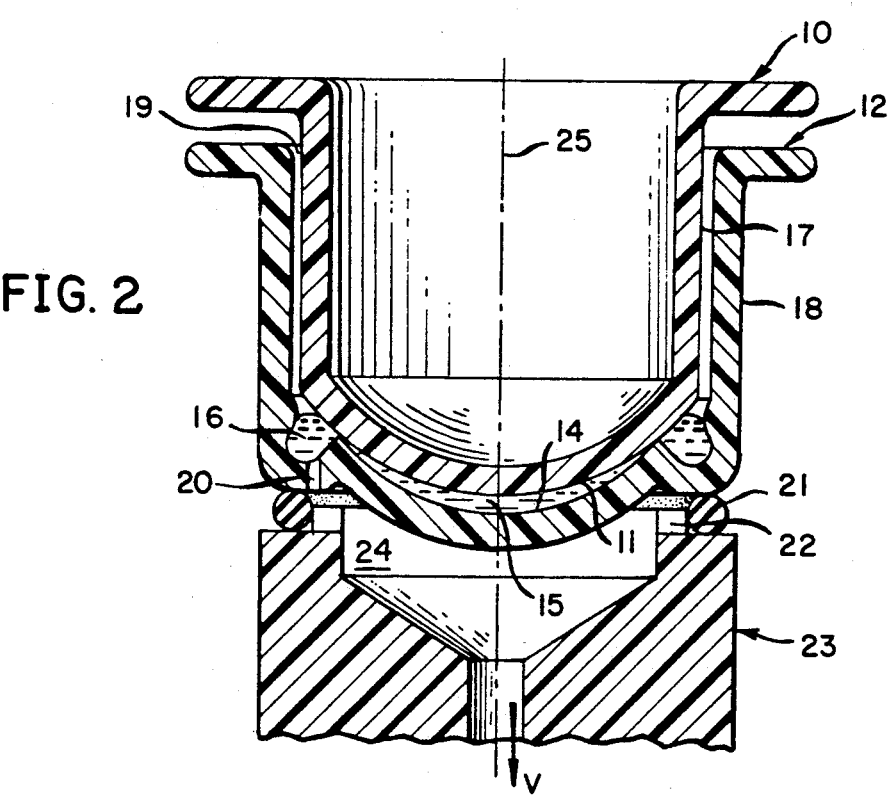
FIG. 2 illustrates the mold halves of FIG. 1 mated to form a contact lens shaped cavity filled with lens forming material and excess lens forming material in an annular cavity.

FIG. 1 illustrates a preferred mold-halves design for practice of the invention. First mold half 10 has convex lens molding surface 11. Second mold half 12 has concave lens molding surface 14. The mold halves are matable to form a contact-lens-shaped cavity 15, as illustrated in FIG. 2. Upon mating the mold halves also form annular cavity 16 surrounding contact-lens-shaped cavity 15.

In a preferable embodiment first mold half 10 has first structure 17 extending substantially parallel to axis 25 of convex lens molding surface 11. Second mold half 12 has second structure 18 extending substantially parallel to the axis of concave lens molding surface 14. When the mold halves are mated, as shown in FIG. 2, second structure 18 encloses at least part of first structure 17, and annular cavity 16 is below the first and second structures. In FIGS. 1 and 2, the axes of the lens molding surfaces coincide and are identified by only one reference numeral, 25. Of course for some lenses the lens forming surfaces may have different axes, and that is also within the scope of this invention.

Annular cavity 16 has two openings in fluid communication with the environment outside of the mated mold halves. In the preferred arrangement shown in FIG. 2, the first opening is annular space 19 between structures 17 and 18. The second opening is hole 20 in second mold half 12, preferably at or near the bottom of annular cavity 16. Of course, the opening should not pierce the contact-lens-shaped cavity.

The openings in the annular cavity may be produced in a number of ways. They may be molded into the mold halves. One of the openings may be formed between the mold halves upon mating, such as annular space 19. The openings may be cut with a laser, a drill, or a saw. The method used to form the openings is not critical.

Means for producing differential gas pressure across the openings in the annular cavity are also present. The differential gas pressure may be produced by pulling vacuum on one opening while the other is in contact with the atmosphere. Alternatively pressurized gas could be blown into one of the openings while the other is in contact with the atmosphere. Any arrangement producing sufficient differential gas pressure across the openings to remove excess lens forming material will suffice.

Preferred means for producing differential gas pressure are shown in FIGS. 1 and 2. Second mold half 12 rests upon support 23, which connects to the vacuum source and has annular projection 22. "O" ring 21, constructed of flexible material, e.g. rubber, surrounds and is attached to projection 22. A gas tight seal is formed between "O" ring 21 and second mold half 12. "O" ring 21 does not block opening 20. Opening 24 within annular projection 22 is connected to a conventional vacuum source.

The apparatus of FIGS. 1 and 2 functions as follows. Lens forming material 30, in excess of the amount needed to fill contact-lens-shaped cavity 15, is deposited on concave lens molding surface 14. The mold halves are mated to form contact-lens shaped cavity 15 filled with lens forming material and annular cavity 16 containing excess lens forming material. Before cure of the lens forming material in cavity 15, vacuum, represented by arrow V, is pulled on opening 24 through opening 20. Excess lens forming material is thereby sucked from the annular cavity by differential gas pressure across openings 19 and 20.

After excess lens forming material has been removed, the lens forming material in cavity 15 is cured by conventional means. The method of cure is not part of this invention. Any method such as heating the mated mold halves, exposing them to U.V. radiation, etc. will suffice.

Figure 3:
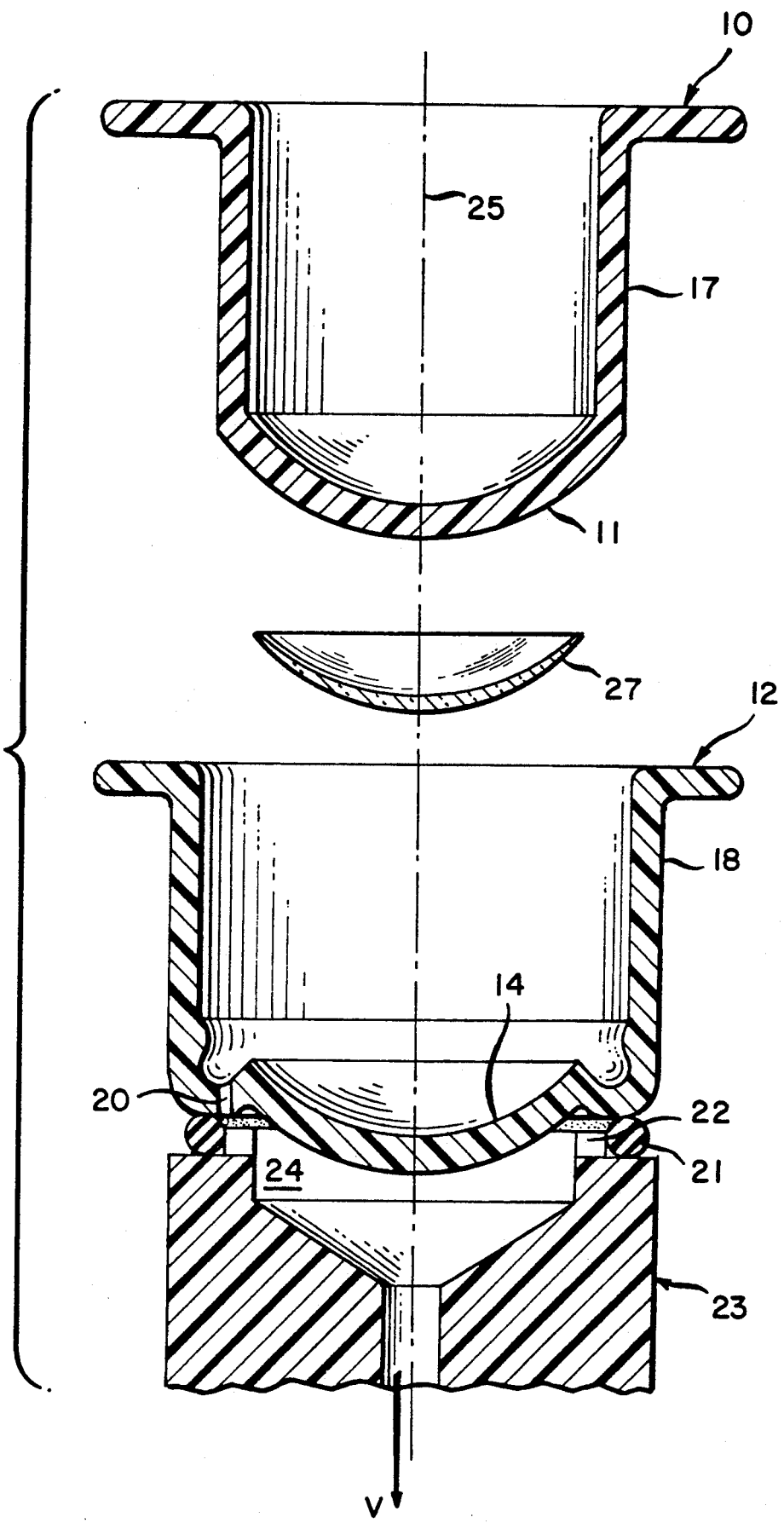
FIG. 3 illustrates the apparatus of FIGS. 1 and 2 after cure of the contact lens forming material. A contact lens produced by the process is also shown in FIG. 3.

Upon completion of cure, the mold halves are opened to obtain a contact lens. FIG. 3 shows the mold halves opened and contact lens 27 that has been produced by the process.

The width of the opening between first and second structures 17 and 18 is not critical as long as it provides for efficient flow of excess lens forming material when subjected to pressure or vacuum. In the preferred mold design the width is about 0.6 mm. The diameter of opening 20 is also not critical as long as it provides for efficient removal of excess lens forming material. In the preferred mold design, the diameter is about 1.6 mm. It is understood that the number and dimensions of the openings, in combination with the extent of differential pressure applied (vacuum or pressure), will determine the rate of removal of excess lens forming material. With the above dimensions a vacuum of about 22 inches of Hg is used and excess lens forming material is efficiently removed in about 2-3 seconds.

Figure 4:
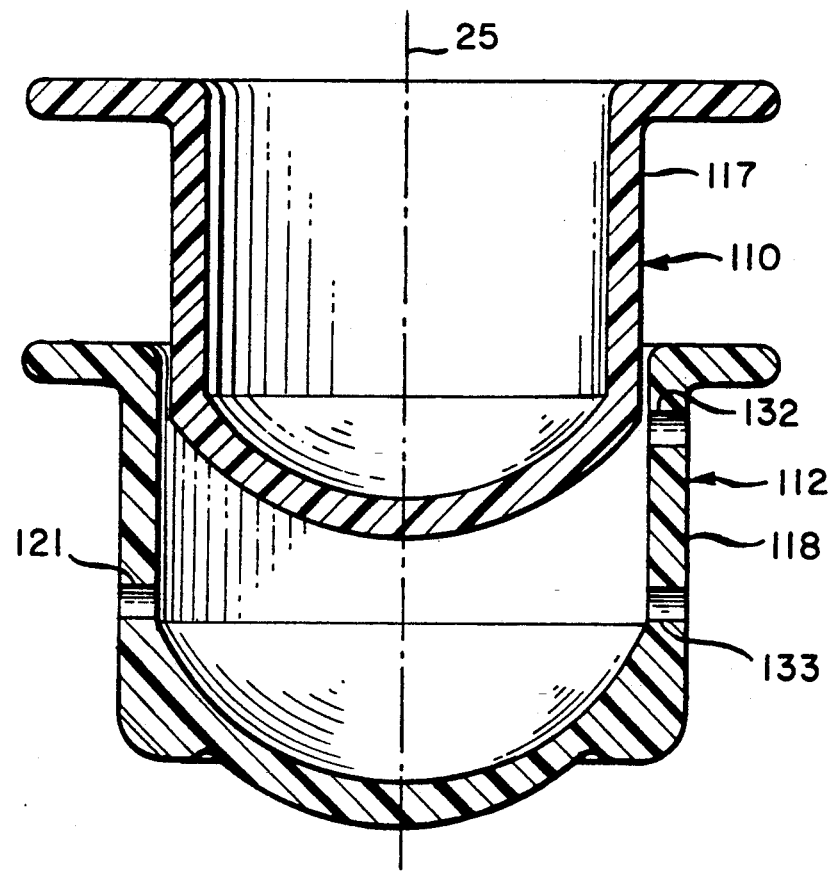
FIG. 4 illustrates alternative mold halves that may be used to practice the invention.
Figure 5:
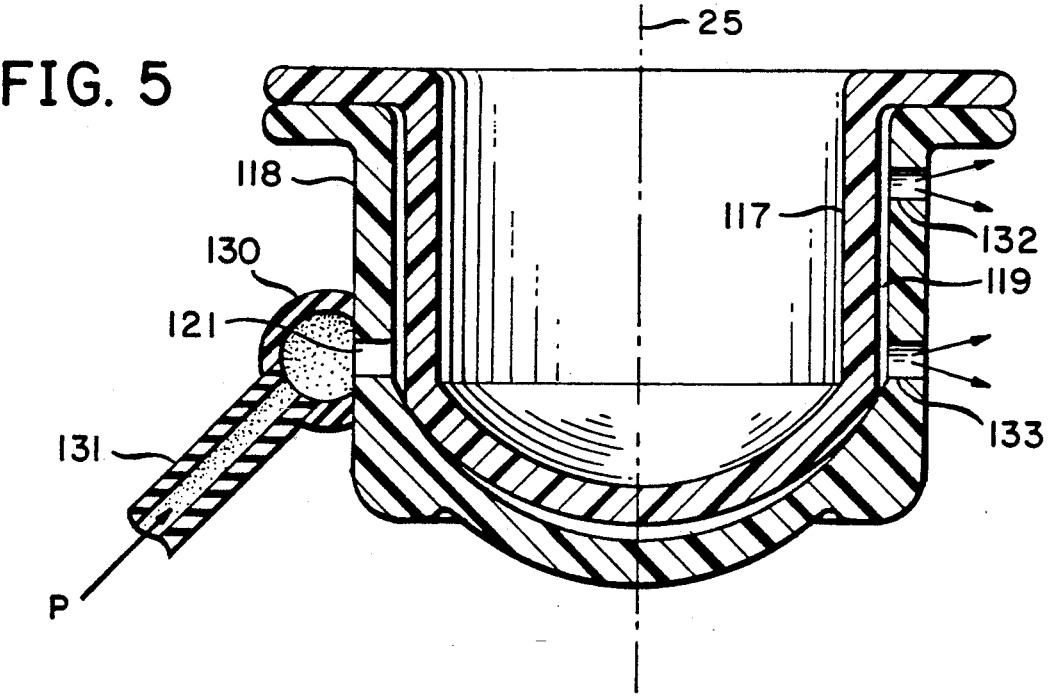
FIG. 5 illustrates the mold halves of FIG. 4 mated to form a contact-lens-shaped cavity and a flash cavity.

FIGS. 4 and 5 illustrate alternative, less preferred apparatus for practicing the invention. In this embodiment first and second mold halves 110 and 112, respectively are used. The annular cavity is the space 119 between first and second structures 117 and 118 when the mold halves are mated. Here more than two openings are provided. First opening 121 is attached to elastomeric cup 130, which, in turn is connected to pressure hose 131. Second and third openings 132 and 133 in the annular cavity are provided. Excess lens forming material is removed by blowing pressurized gas, e.g. air, through hose 131 into hole 121 through annular cavity 119 and out through openings 132 and 133.

Figure 6:
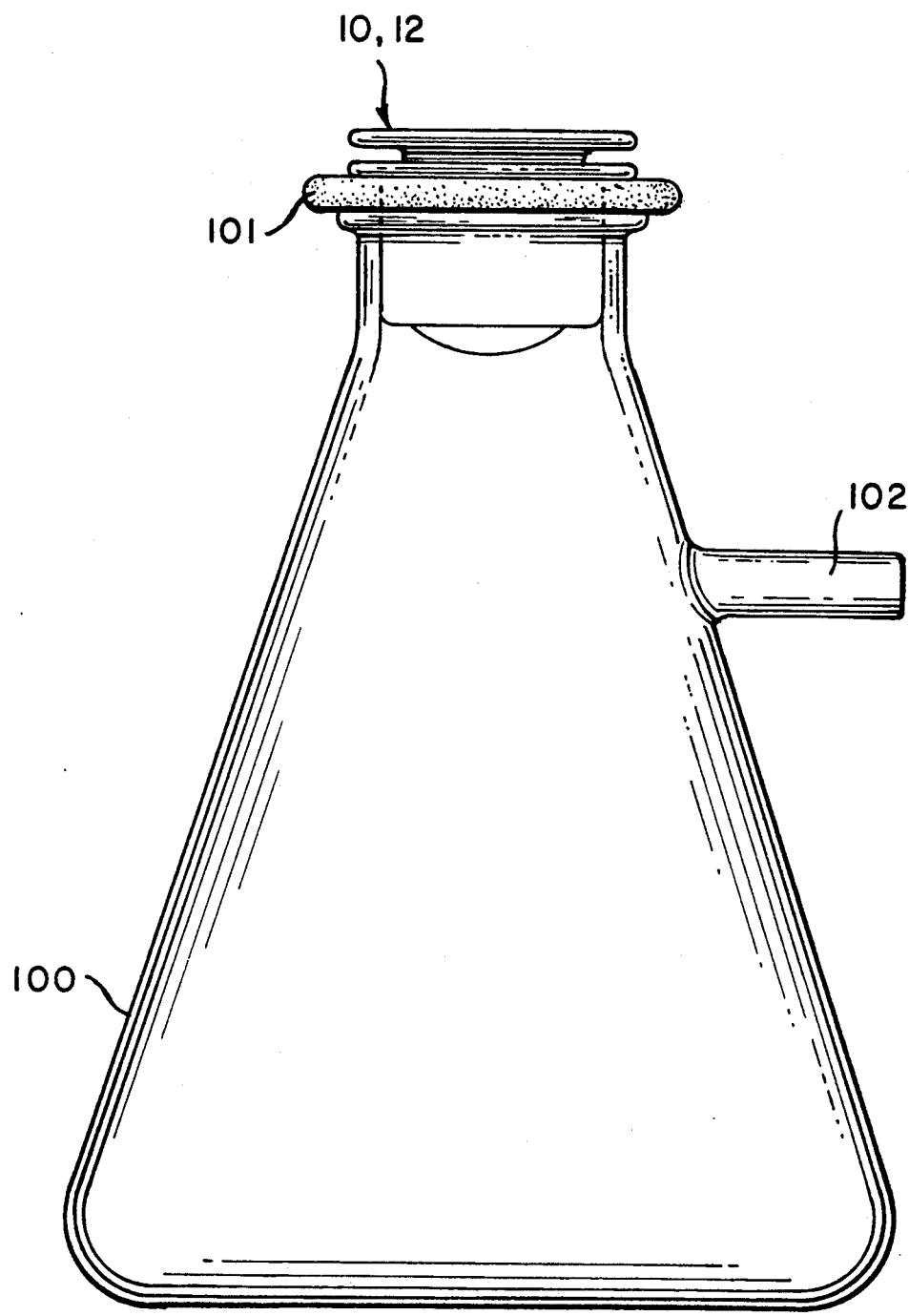
FIG. 6 illustrates alternative apparatus for providing vacuum to the mold halves shown in FIGS. 1, 2 and 3.

FIG. 6 illustrates alternative apparatus for applying vacuum to the mold halves of FIGS. 1, 2 and 3. In FIG. 6, Erlenmeyer flask 100 supports rubber seal 101, which in turn supports mated mold halves 10 and 12. Vacuum is pulled on the bottom of the mated mold halves through opening 102.

We claim:

1. In a process for molding both sides of a contact lens comprising the steps of:
   a. providing a first mold half having a convex lens molding surface;
   b. providing a second mold half having a concave lens molding surface, said mold halves being matable to form a contact-lens-shaped cavity and an annular cavity surrounding the contact-lens-shaped cavity, the annular cavity having at least two openings in fluid communication with the environment outside the mated mold halves;
   c. depositing lens forming material on the concave lens forming surface in excess of the amount needed to fill the contact-lens-shaped cavity;
   d. mating the mold halves to form the contact-lens-shaped cavity filled with contact lens forming material and the annular cavity containing excess contact lens forming material; and
   e. curing the contact lens forming material to form a contact lens in the contact-lens-shaped cavity;
   the improvement comprising:
   f. before the step e. curing is completed, producing differential gas pressure across the openings in the annular cavity to substantially remove the excess lens forming material from the annular cavity.

2. The process of claim 1 wherein the concave and convex lens molding surfaces have axes;
   the first mold half has a first structure extending substantially parallel to the axis of the convex lens molding surface;
   the second mold half has a second structure extending substantially parallel to the axis of the concave lens molding surface;
   when the mold halves are mated, the second structure is capable of enclosing at least part of the first structure and the annular cavity is located below the first and second structures;
   one of the openings in the annular cavity is space between the first and second structures; and
   the other opening is a hole in the second mold half.

3. The process of claim 2 wherein step f. is performed by pulling vacuum on the hole in the second mold structure from outside of the second mold half.

4. Apparatus for molding both sides of a contact lens comprising:
   a. a first mold half having a convex lens molding surface having a first axis and a first structure extending substantially parallel to said first axis;
   b. a second mold half having a concave lens molding surface having a second axis and a second structure extending substantially parallel to said second axis; said second structure being capable of enclosing at least part of said first structure, said mold halves being capable of mating to form a contact-lens-shaped cavity and an annular cavity having a bottom surrounding said contact-lens shaped cavity; and
   c. first and second openings in the annular cavity in fluid communication with the environment surrounding the mold halves when mated said first opening comprising space between the first and second structures and said second opening comprising a hole in the bottom of the annular cavity.

5. The apparatus of claim 4 further comprising means for producing differential gas pressure across the openings in the annular cavity.

6. The apparatus of claim 5 wherein the differential pressure means comprises a source of vacuum sealed over the hole in the bottom of the annular cavity.

7. The apparatus of claim 6 further comprising a support for the second mold half having an annular projection for holding an "O" ring and an opening within the annular projection connected to a vacuum source, said "O" ring capable of providing a gas tight seal against the second mold half surrounding the hole in the bottom of the annular cavity.

8. In apparatus for molding both sides of a contact lens comprising:
 a. a first mold half having a convex lens molding surface;
 b. a second mold half having a concave lens molding surface, said mold halves being matable to form a contact-lens-shaped cavity and an annular cavity surrounding the contact-lens-shaped cavity, the annular cavity having at least two openings in fluid communication with the environment outside of the mated mold halves;
the improvement comprising:
 c. means for producing differential gas pressure across the openings in the annular cavity.

* * * * *